(12) United States Patent
Addae-Mensah et al.

(10) Patent No.: US 9,188,243 B2
(45) Date of Patent: Nov. 17, 2015

(54) MICROFLUIDIC FLOW DEVICES, METHODS AND SYSTEMS

(75) Inventors: Kweku Addae-Mensah, Hackensack, NJ (US); Yuk Kee Cheung, New York, NY (US); Samuel K. Sia, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 439 days.

(21) Appl. No.: 13/575,942

(22) PCT Filed: Jan. 28, 2011

(86) PCT No.: PCT/US2011/023012
§ 371 (c)(1),
(2), (4) Date: Oct. 11, 2012

(87) PCT Pub. No.: WO2011/094605
PCT Pub. Date: Aug. 4, 2011

(65) Prior Publication Data
US 2013/0048092 A1 Feb. 28, 2013

Related U.S. Application Data

(60) Provisional application No. 61/299,728, filed on Jan. 29, 2010.

(51) Int. Cl.
*F16K 31/00* (2006.01)
*F16K 99/00* (2006.01)
*B01L 3/00* (2006.01)

(52) U.S. Cl.
CPC ....... *F16K 99/0001* (2013.01); *B01L 3/502738* (2013.01); *F16K 99/0026* (2013.01); *F16K 99/0046* (2013.01); *F16K 99/0061* (2013.01); *B01L 2300/0887* (2013.01); *B01L 2400/0655* (2013.01); *F16K 2099/008* (2013.01);
(Continued)

(58) Field of Classification Search
CPC ............ F16K 99/0001; F16K 99/0015; F16K 2099/008; B01L 2400/0638
USPC .................... 137/15.18, 315.03, 315.27, 597; 251/57, 61, 61.1; 11/15.18, 315.03, 11/315.27, 597
See application file for complete search history.

(56) References Cited

U.S. PATENT DOCUMENTS

| 4,744,386 A * | 5/1988 | Frazer ...................... 137/315.31 |
| 2004/0112442 A1 | 6/2004 | Maerkl et al. |
| 2005/0098748 A1 * | 5/2005 | Suzuki ............................ 251/57 |

(Continued)

OTHER PUBLICATIONS

International Search Report dated Apr. 11, 2011 for International Application No. PCT/US11/23012.
(Continued)

*Primary Examiner* — John K Fristoe, Jr.
*Assistant Examiner* — Reinaldo Sanchez-Medina
(74) *Attorney, Agent, or Firm* — Miles & Stockbridge P.C.; Mark A. Catan

(57) ABSTRACT

Microfabricated microvalves may be used with liquid-filled control channels and actuated using compact and battery-powered components, without the need for heavier or fixed infrastructure. The disclosed embodiments include microvalves with on-off fluid control with relatively fast response times, coordinated switching of multiple valves, and operation of a biological (enzyme-substrate) assay in a handheld configuration.

30 Claims, 11 Drawing Sheets

(52) U.S. Cl.
CPC .... *F16K2099/0084* (2013.01); *Y10T 29/49002* (2015.01); *Y10T 137/0324* (2015.04)

(56) References Cited

U.S. PATENT DOCUMENTS

| | | | |
|---|---|---|---|
| 2007/0051412 A1 | 3/2007 | Heath et al. | |
| 2007/0074972 A1 | 4/2007 | Nassef et al. | |
| 2008/0135114 A1* | 6/2008 | Takayama et al. | 137/561 R |
| 2008/0173833 A1 | 7/2008 | Vyawahare et al. | |
| 2010/0252123 A1* | 10/2010 | Mathies et al. | 137/206 |
| 2010/0303687 A1* | 12/2010 | Blaga et al. | 422/504 |
| 2011/0005932 A1* | 1/2011 | Jovanovich et al. | 204/453 |
| 2012/0298233 A1* | 11/2012 | Rothacher | 137/613 |

OTHER PUBLICATIONS

Written Opinion dated Apr. 11, 2011 for International Application No. PCT/US11/23012.

Gu et al., "Computerized Microfluidic Cell Culture Using Elastomeric Channels and Braille Displays," *PNAS*, vol. 101, No. 45, pp. 15861-15866 (Nov. 9, 2004).

Unger et al., "Monolithic Microfabricated Valves and Pumps by Multilayer Soft Lithography," *Science* vol. 288, pp. 113-116, (Apr. 7, 2000).

Lee et al., "Multistep Synthesis of a Radiolabeled Imaging Probe Using Integrated Microfluidics," *Science*, vol. 310, pp. 1793-1796 (Dec. 16, 2005).

Zhong et al., "A Microfluidic Processor for Gene Expression Profiling of Single Human Embryonic Stem Cells," *The Royal Society of Chemistry Lab Chip*, vol. 8, pp. 68-74 (2008).

Balagadde et al., "Long-Term Monitoring of Bacteria Undergoing Programmed Population Control in a Microchemostat," *Science*, vol. 309, pp. 137-140 (Jul. 1, 2005).

Lii et al., "Real-Time Microfluidic System for Studying Mammalian Cells in 3D Microenvironments," *Analytical Chemistry*, vol. 80, pp. 3640-3647 (Apr. 8, 2008).

Grover et al., "Monolithic Membrane Valves and Diaphragm Pumps for Practical Large-Scale Integration into Glass Microfluidic Devices," *Sensors and Actuators B:Chemical*, vol. 89, pp. 315-323 (, 2003).

Skelley et al., "Development and Evaluation of a Microdevice for Amino Acid Biomarker Detection and Analysis on Mars," *PNAS*, vol. 102, No. 4, pp. 1041-1046 (Jan. 25, 2005).

Weibel et al., "Torque-Actuated Valves for Microfluidics," *Analytical Chemistry*, vol. 77, No. 15, pp. 4726-4733 (Aug. 1, 2005).

Beebe et al., "Functional Hydrogel Structures for Autonomous Flow Control Inside Microfluidic Channels," *Nature*, vol. 404, pp. 588-590 (Apr. 6, 2000).

Kutter et al., "Microfluidics-Components," *Microsystem Engineering of Lab-on-a-Chip Devices*, pp. 39-77 (2004).

Sershen et al., "Independent Optical Control of Microfluidic Valves Formed from Optomechanically Responsive Nanocomposite Hydrogels," *Advanced Materials*, vol. 17, pp. 1366-1368 (2005).

Ahn et al., "Disposable Smart Lab on a Chip for Point-of-Care Clinical Diagnostics," IEEE, vol. 92, No. 1, pp. 154-173 (Jan. 2004).

R. B. Fair, "Digital Microfluidics: Is a True Lab-On-A-Chip Possible?," *Microfluid Nanofluid*, vol. 3, pp. 245-281 (Mar. 8, 2007).

Futai et al., "Handheld Recirculation System and Customized Media for Microfluidic Cell Culture," *Lap Chip, The Royal Society of Chemistry*, vol. 6, pp. 149-154 (2006).

Wei et al., "Mutliplexed Hydraulic Valve Actuation Using Ionic Liquid Filled Soft Channels and Braille Displays," *App. Phys. Lett.*, 90, 033505 (2007).

Sanchez et al., "Density, Viscosity, and Surface Tension of Synthesis Grade Imidazolium, Pyridinium, and Pyrrolidinium Based Room Temperature Ionic Liquids," *American Chemical Society*, vol. 54, pp. 2803-2812 (2009).

Chin et al., "Lab-on-a-chip Devices for Global Health: Past Studies and Future Opportunities," *The Royal Society of Chemistry*, vol. 7, 2007, pp. 41-57 (first published Oct. 27, 2006).

Yager et al., "Point-of-Care Diagnostics for Global Health", *Annu. Rev. Biomed. Eng.*, vol. 10, 107-144 (first published Mar. 20, 2008).

Srinivasan et al., "Droplet-based Microfluidic Lab-on-a-chip for Glucose Detection", *Analytica Chimica Acta*, vol. 507, pp. 145-150 (2004).

Pollack et al., "Electrowetting-based Actuation of Liquid Droplets for Microfluidic Applications," *Appl. Phys. Lett.*, vol. 77, pp. 1725-1726, (Sep. 11, 2000).

* cited by examiner

*FIG. 7A*     *FIG. 7B* t = 19 secs t = 56 secs

——— FIG. 9B ———

MICROFLUIDIC FLOW DEVICES, METHODS AND SYSTEMS

FEDERALLY SPONSORED RESEARCH AND DEVELOPMENT STATEMENT

The invention was made with government support under Grant/Contract No. NIH NR010753 awarded by the National Institutes of Health ("NIH"). The government has certain rights in the invention.

CROSS-REFERENCE TO RELATED APPLICATIONS

This application is a 371 national stage of International Application No. PCT/US2011/023012 filed Jan. 28, 2011, which claims priority to and the benefit of U.S. Provisional Application No. 61/299,728 filed Jan. 29, 2010. The content of each of the foregoing applications is incorporated herein by reference in its entirety.

FIELD OF THE DISCLOSED SUBJECT MATTER

The disclosed subject matter is in the field of elastomeric microvalves, particularly systems, methods, and apparatuses for controlling elastomeric microvalves via liquid-filled control channels.

BACKGROUND

Many integrated portable sensors and diagnostic systems require multiple fluid processing steps. One component of lab-on-a-chip (LOC) devices is valves, which enable control of fluid flow, isolation of different regions, and movement of sample, reagents, or reaction products without cross-contamination or unintended mixing. In recent years, the use of multilayer soft lithography for making microfabricated pneumatic valves has provided a reliable and versatile platform for advanced fluid handling in LOC devices, offering advantages of rapid prototyping and biocompatibility compared to silicon-based MEMS. Such pneumatic valves have been used for a wide range of research applications taking place in centralized facilities.

Pneumatic valves may use laboratory infrastructure such as gas tank, computers, and ground electricity for their operation. Other valves that have been developed for use in LOC applications included screw-based valves, stimuli-responsive hydrogels, passive valves, and burst valves. These valves may lack automated operation, fast response times, resistance to leakage, independence of external infrastructure, and ability to be used multiple times for an ideal portable LOC system.

Fluid handling is useful for a variety of LOC procedures. Elastomeric valves made by multilayer soft lithography, for example, have desirable features. When used with external devices such as gas tanks, computers, and ground electricity, their portability may be reduced.

SUMMARY OF THE DISCLOSED SUBJECT MATTER

The Summary describes and identifies features of some embodiments. It is presented as a convenient summary of some embodiments, but not all. Further the Summary does not identify critical or essential features of the embodiments, inventions, or claims.

According to embodiments of the disclosed subject matter, a portable handheld instrument operates membrane-based microvalves, based on the hydraulic principle for actuation. Disclosed embodiments also include methods of making a portable, handheld instrument to operate membrane-based microvalves. The embodiments include devices that are operable by solenoids valves and which employ final actuator mechanisms adaptable for microfluidic devices such as LOC devices.

BRIEF DESCRIPTION OF THE DRAWINGS

The accompanying drawings illustrate embodiments of the disclosed subject matter. The disclosed subject matter will be best understood by reading the ensuing specification in conjunction with the drawing figures, in which like elements are designated by like reference numerals, and wherein:

FIG. 7A is a Bright Field image of a closed valve according to embodiments of the disclosed subject matter.

FIG. 7B is a Bright Field image of an open valve according to embodiments of the disclosed subject matter.

FIGS. 9A and 9B are various representations regarding parallel operation of multiple valve locations.

DETAILED DESCRIPTION

Generally speaking, a handheld instrument or device for actuating elastomeric microvalves may be constructed so as to include four linear pull-type solenoids, for example, for controlling the microvalve system and which can be attached to a plate that could move vertically and/or horizontally (in order to accommodate a microfluidic chip) relative to a fixed base plate. The positions of the solenoids may be designed such that they align with positions of inlets into a control layer of the microfluidic chip. The positions of the inlets can be spaced apart (e.g., at least 12 mm) to accommodate interfacing with multiple solenoids. The microfluidic channels in the control layer can be filled with a fluid (such as water).

Each linear pull-type solenoid can include a plunger (movable iron component) and a coil assembly. Initial contact of the solenoid plungers with PDMS membranes (e.g., ~250 μm thick) covering the inlets to the control channels may result in the downward deflection of the membranes, thereby transmitting force through the fluid-filled control channels to a relatively thin membrane (e.g., ~30 μm) between the control and the fluid layers. As a result, the microvalves in the fluid layer can be closed. When a voltage is applied to the coil assembly, a magnetic attractive force is produced between the plunger and the coil, thereby pulling the plunger into the metal housing; in turn, the corresponding microvalve in the fluid layer can be opened.

A return spring may be implemented, whereby it can be inserted between the plunger and the metal housing, such that the plunger can move out of the housing (e.g., to close the microvalve) immediately after switching off the voltage. Such solenoid configuration can provide: i) the microvalves may be closed in the absence of voltage supplied to the solenoids, and ii) the plunger can be primed for movement upon re-application of voltage to the solenoids.

Figure 1:
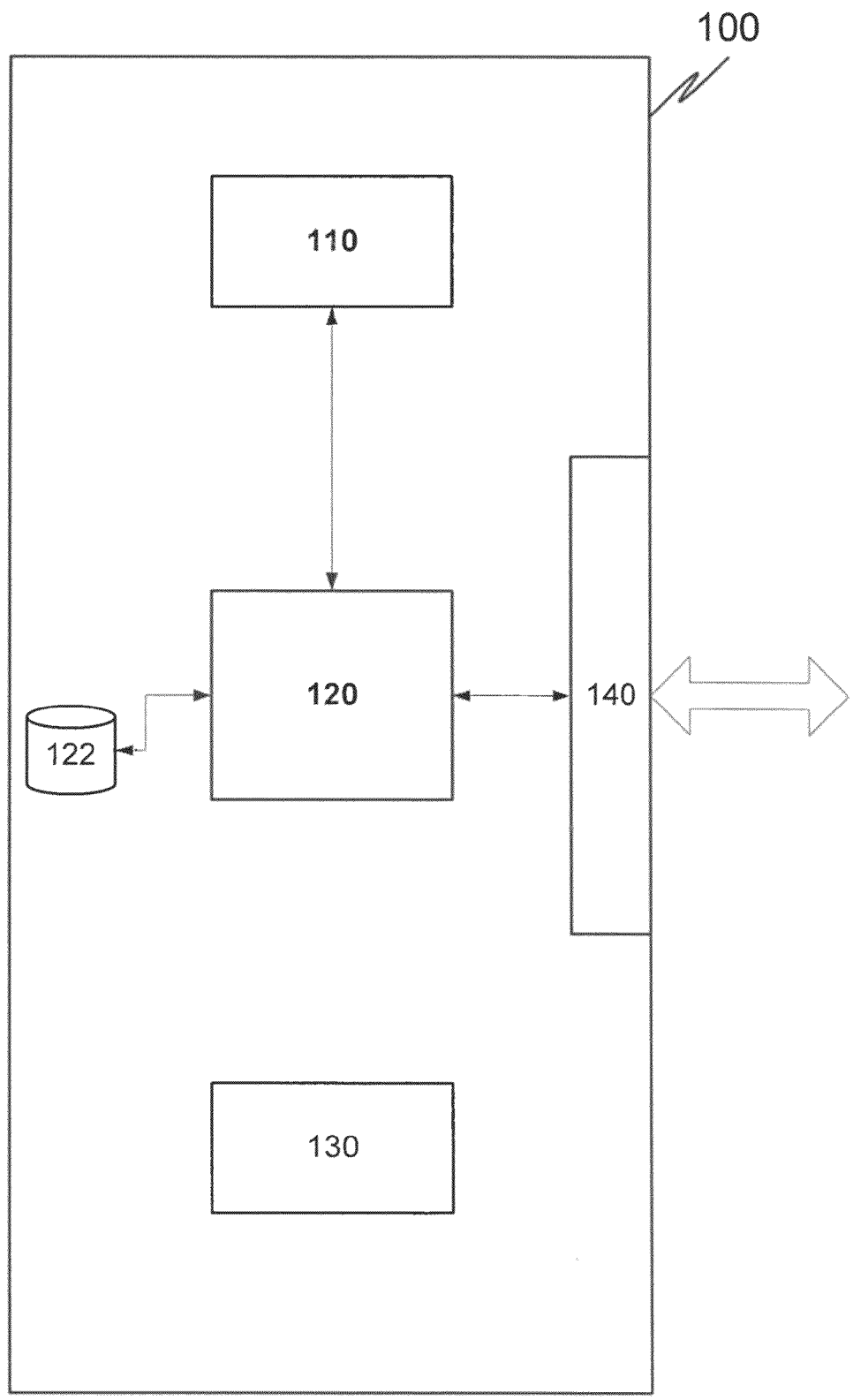
FIG. 1 is a block diagram of an apparatus or device according to embodiments of the disclosed subject matter.

FIG. 1 is a block diagram of a portable apparatus or device 100 according to embodiments of the disclosed subject matter. In various embodiments, the portable device 100 can be a hand-held device. In various embodiments, device 100 can include a microbial culture system and an external actuation system therefor.

Device 100 can comprise a microvalve element 110 having one or more controllable microvalves. Device 100 also can comprise a microcontroller or microprocessor 120 coupled to the microvalve element 110 in order to control operation of the microvalve element 110 and to receive signals therefrom, such as operational state data or information (e.g., "on" or "off" state(s) of microvalve element). Microcontroller 120 can have a programmable component and a drive component connected to an actuation portion of the microvalve element 110.

Coupled to microcontroller 120 may be an electronic storage element 122, such as a ROM, RAM, DRAM, SRAM, EEPROM, etc. The storage element 122 can be used, among other things, to store data or information regarding the microvalve element 110, such as switching time(s), a quantity of changes in states, valve statuses, etc. Though shown as being external to microcontroller 120, storage element 122 can be internal to microcontroller 120, or, optionally or alternatively, it can be external to device 100. Device 100 also may have a power source 130, for example a battery, to provide operational power to the device components (power connections not explicitly shown). In various embodiments, the power source 130 may be a battery, for example, a 9V battery; and the battery can provide the sole means for powering the microvalve element 110, or the sole means for powering the actuation portion of the microvalve element 110. Optionally or alternatively, power source 130 can be from outside device 100, such as via a conventional laboratory electrical outlet. Device 100 also may have an interface 140. Interface 140 can be a user interface for entering and/or receiving data or information regarding device 100, such as data or information regarding the microvalve element 110, including data or information for controlling the microvalve element 110.

Figure 2A:
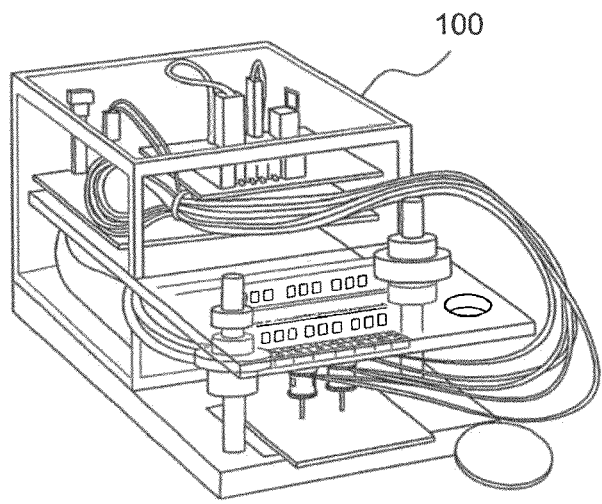
FIG. 2A is a picture of one example of an apparatus or device according to the disclosed subject matter.
Figure 2B:
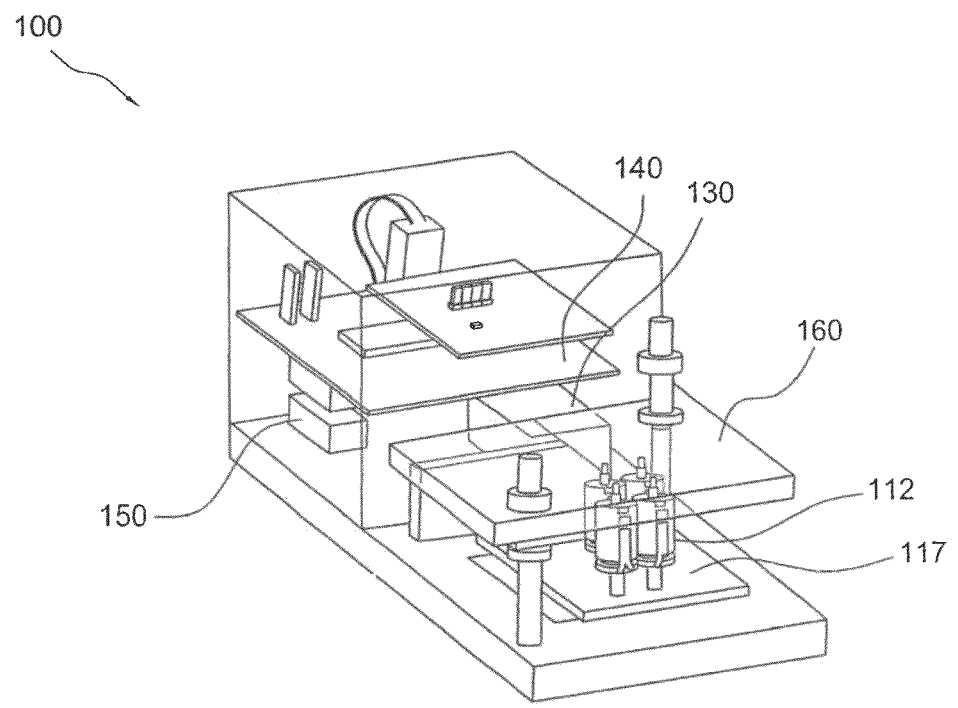
FIG. 2B is a simplified diagrammatic representation of the device shown in FIG. 2A.

FIG. 2A is a pictorial representation of one example of device 100 according to embodiments of the disclosed subject matter. FIG. 2B is a simplified diagrammatic representation of the device shown in FIG. 2A. As shown in FIGS. 2A and 2B, device 100 may further include an enclosure, which can enclose some or all of the device's components. As can be seen from FIGS. 2A and 2B, embodiments of device 100 can further comprise a printed circuit board 140 having mounted thereto microcontroller 120 and optionally storage element 122, a pump 150, such as a micropump or a syringe pump, and a movable plate 160, which will be discussed in more detail below. The overall footprint of the device 100 is shown in FIG. 2B as 13×7.6×5.8 cm, for example. Further, device 100 can be operated by a 9V dry-cell battery, for instance.

Figure 3:
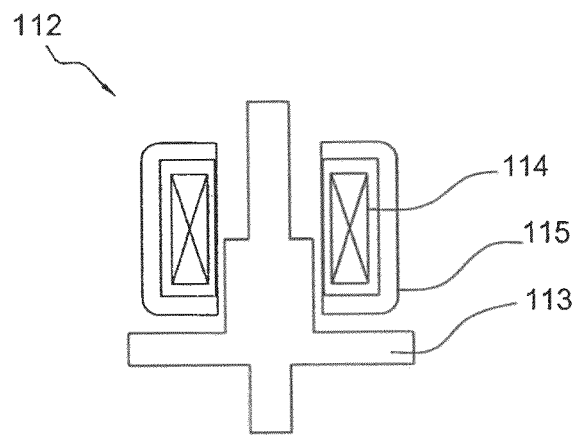
FIG. 3 is a cross section of a solenoid according to embodiments of the disclosed subject matter.

The microvalve element 110 can include one or more solenoids 112 each having a plunger 114 with a return mechanism 116 (e.g., a return spring or the like) to apply a restoring force and being associated with one or more microfluidic channels to drive a hydraulic fluid therethrough. FIG. 3 is a cross section of a solenoid 112 according to embodiments of the disclosed subject matter. Note that a return mechanism is not shown in FIG. 3. Solenoid 112 also may include a coil assembly 114 and a case 115.

The one or more solenoids 112 drive the hydraulics and may be cylindrical plungers of diameter of 5 mm or less, 1.2 mm, for example. Moreover, the one or more solenoids 112 may be operated using between 6.5 and 9 volts and can be rated for force between 0.07 and 1.2 N and stroke lengths from 0.25 to 1.25 mm, for example.

Optionally, as indicated above, each solenoid 112 may include a spring 116 (e.g., rated between 0.014-0.17 N/mm) between the plunger 113 and the solenoid body to provide a return mechanism for the solenoid plunger 113 such that the solenoid actuator has a home position and an activated position. The one or more solenoids may be attached to movable plate 160 that can move freely in a vertical direction and/or a horizontal direction such that the plungers 113 can be aligned with positions of corresponding access holes of a control layer of a multi-layer substrate 117 of the microvalve element 110.

Figures 4A, 4B:
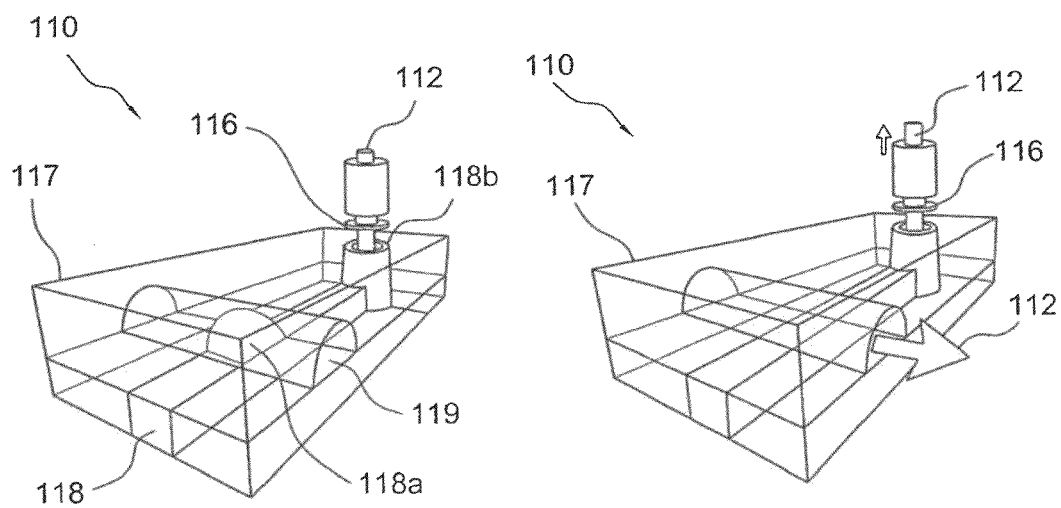
FIGS. 4A and 4B are diagrammatic representations of a multi-layer substrate according to embodiments of the disclosed subject matter.

As indicated above, microvalve element 110 also can include a multi-layer substrate 117, such as a microfluidic chip. FIGS. 4A and 4B are diagrammatic representations of a multi-layer substrate 117 according to embodiments of the disclosed subject matter. Multi-layer substrate 117 can form one or more microfluidic channels such that a hydraulic fluid can be driven through the channels.

Multi-layer substrate 117 can include a control layer or channel 118 and a flow layer or channel 119. In various embodiments, control layer or channel 118 and flow layer or channel 119 can be formed in layers at different levels than one another. Generally speaking, control channel 118 can be controlled by its corresponding solenoid 112 to either allow or disallow passage of fluid through flow channel 119. Put another way, the solenoid actuator is connected to control channel 118 to drive a hydraulic fluid therethrough in order to control flow of a liquid through flow channel 119.

The control channel 118 can be separated from flow channel 119 by a flexible barrier forming a valve 118a configured to regulate flow in the regulated microfluidic channel (i.e., the flow channel 119) and such that the valve 118a is opened and closed, respectively, in response to the solenoid actuator being driven between its home and activated positions. The flexible barrier as a valve can be any suitable valve, and, optionally, can be a membrane-based microvalve. The membrane can be any suitable thickness, such as between 50 and 1000 μm. Optionally, the control channel 118 can be configured with zero fluid loss. Zero fluid loss for the control channel 118 may be provided in order to operate the valve 118*a* repeatedly. Each solenoid actuator may draw a minimum electrical current in its home position, wherein its home position corresponds to a predefined one of opened and closed positions.

Note that in FIG. 4A shows the valve 118*a* being in a closed state (i.e., some or all of fluid flow 112 through flow channel 119 is blocked when solenoid 112 is in an off state. In FIG. 4B, valve 118*a* is in an open state when solenoid 112 is in an on state, thereby allowing full or partial flow 112 of fluid through flow channel 119.

In embodiments, microfluidic flow 119 and control 118 layers may be fabricated using standard methods, with a push-up configuration where the control layer 118 is located, for example, below the fluid flow layer 119. The control and flow layers 118, 119 may be bonded together by treating PDMS pieces in a plasma chamber for thirty-five seconds, for instance. The same technique may be used to bond the PDMS (containing the bonded flow 119 and control 118 layers) to a glass slide. Prior to each bonding step, access holes may be punched into the PDMS block to provide connections to the flow layer 119 and/or control layer 118.

The control layer 118 may be filled with water, for example, to serve as the hydraulic fluid. Before filling the control layer 118, the water may be sonicated for fifteen minutes to eliminate micro-bubbles. With the control layers or channels 118 closed at one end, they may be filled by placing the chip under vacuum for twenty minutes, for example, while water droplets covet the control layer inlets. Once the control channels 118 are completely filled, their inlets may be sealed with a thin PDMS membrane 118*b* as follows.

First, coat a cured PDMS membrane 118*b* (about 3 mm$^2$ in area) with PDMS prepolymer. Then place the membrane 118*b* on the water droplet covering the control channel inlet, and gently pressed the membrane 118*b* down until it covered the inlet and is finely in place, while ensuring that air bubbles are not trapped between the membrane and the control channel inlet. To cure the sealing membrane, the completed device is placed in a humid chamber (e.g., Petri dish containing water-soaked Kim wipes) for forty-eight hours at room temperature. Preferably water is not lost. Ionic liquid (1-Butyl-3-methylimidazolium tetrafluoroborate, Acros Organics) and other fluids may be used instead of water as the fluid in the control channel 118.

Figure 5:
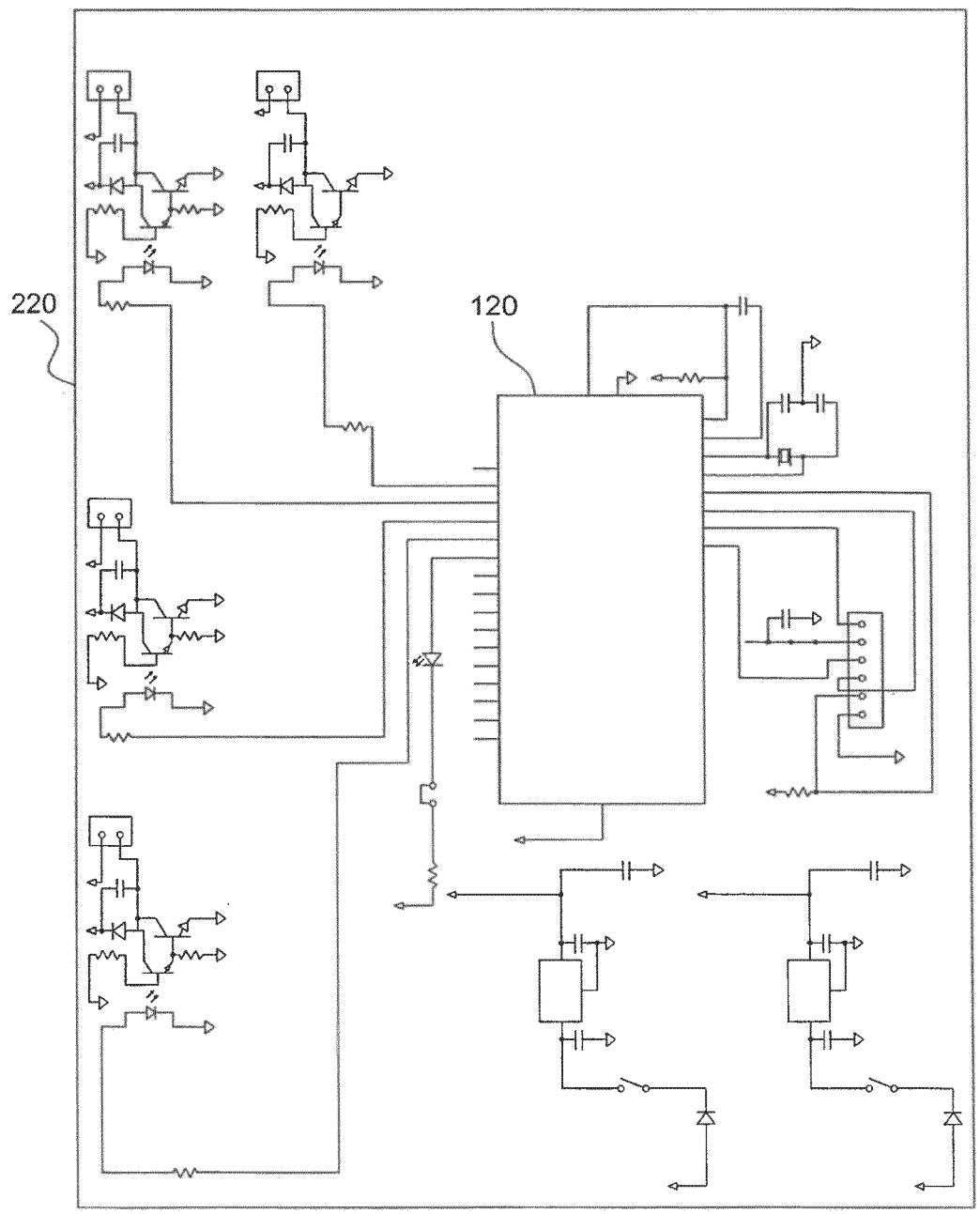
FIG. 5 is a schematic representation of a microcontroller element according to embodiments of the disclosed subject matter.

FIG. 5 is a schematic of one example of a microcontroller element 220 including microcontroller 120 and peripheral circuitry. More specifically, the microcontroller 120 used to control solenoids 112 can be an Atmel Mega32 microcontroller as shown in FIG. 5. Microcontroller element 220 can include electronic components to isolate the microcontroller 120 inputs and outputs from electronic spikes that may be generated by the solenoids 112. Microcontroller element 220 also may incorporate switching transistors to provide required current for the solenoids 112. A voltage regulator also may be provided to supply a fixed (e.g., 5 V) power supply from the power source 130 (e.g., 9 V) for the microcontroller 120. A portion of the microcontroller element 220 that controls micropump 150, which incidentally can be used in enzyme substrate assay experiments, is not shown in FIG. 5.

The microcontroller element 220 can be electrically connected to the solenoid actuator 112 and configured to operate the solenoid actuator 112 to generate a selected pressure of a hydraulic fluid in the control channel 118. Microcontroller 120 can include a programmable component configured to operate the valve 118*a* to perform a microfluidic process control sequence in which longest cycles coincide with a minimum electrical current, whereby the energy required for operation can be minimized. Further, an actuation sequence of the solenoids 112 and valves 118*a* can be pre-programmed into the microcontroller 120. In various embodiments, the microcontroller 120 can have 32 programmable input/output lines and the operating voltage for the microcontroller 120 can be from 4.5 to 5.5V, for example.

The microcontroller element 220 also can control a micropump 150 (e.g., Hargraves Advanced fluidic Solutions E219-12) with operating voltage of 3-6V, for example. Alternatively, a micro syringe may be employed. A liquid trap also may be provided to interface with the micropump 150 of the microfluidic network to prevent liquid from destroying or damaging the micropump 150. The trap can be comprised of a 500 μL well with two outlets, one connected to the micropump 150 and the other connected to the outlet of the microfluidic network. The speed/strength of the micropump 150 can be adjusted by setting a value in the microcontroller 120 which determines the final voltage applied to the micropump 150 using, for example, a pulse width modulation (PWM) algorithm. The speed can be adjusted to account for latency introduced by the liquid trap.

The ability of the solenoids 112 to actuate the valves 118*a* with precision can be characterized. To monitor and investigate time responses of the valves (using, for example, both water and ionic liquid as hydraulic fluid), a MATLAB script may be used to control a NI USB-6009 DAQ card, for example, to apply voltage to the solenoids 112 and for subroutines to capture system time information for the control signals sent from the DAQ card as well as system time information for video frames captured using a QImaging Retiga 2000R 16 bit monochrome camera, for instance.

Figure 6A:
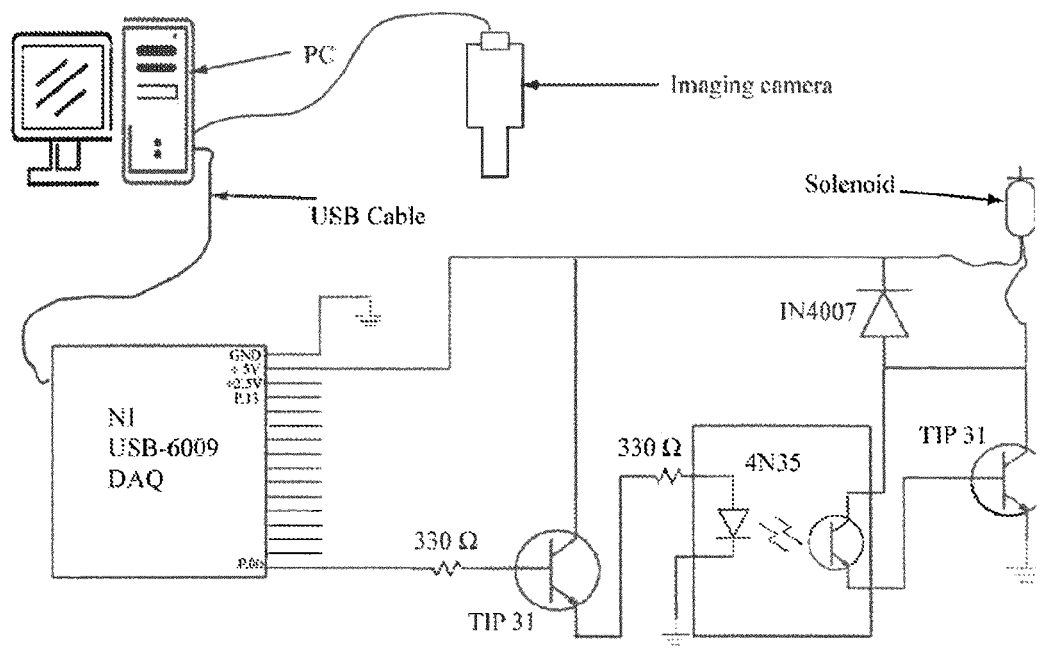
FIG. 6A is a circuit diagram for measuring response times of microvalves according to embodiments of the disclosed subject matter.
Figure 6B:
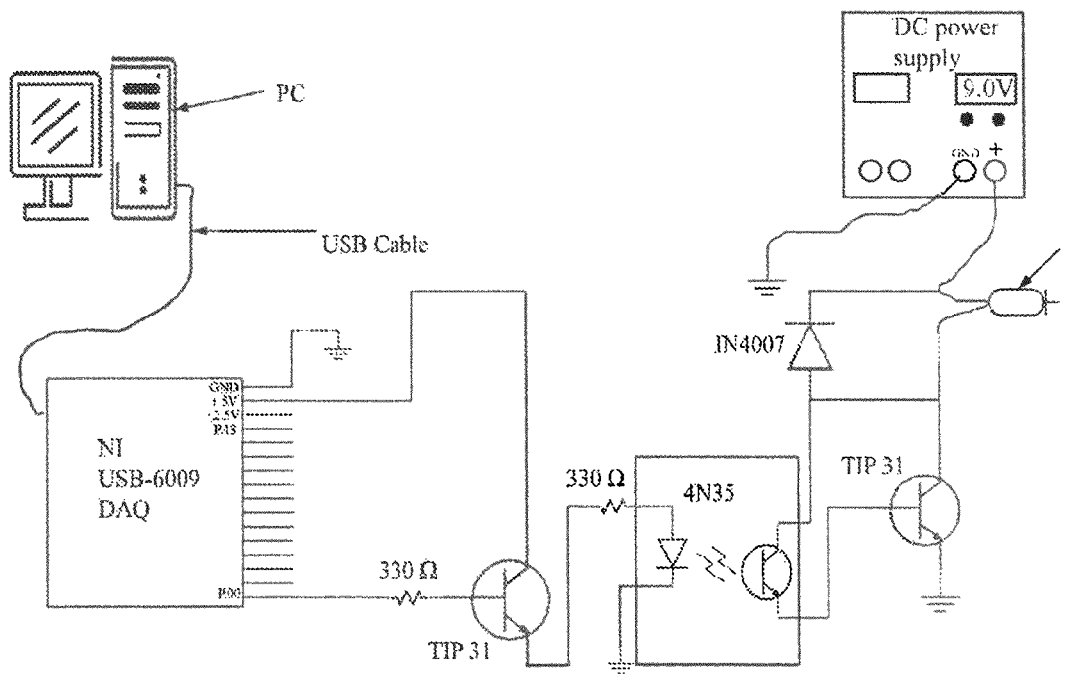
FIG. 6B is a circuit diagram for measuring power drawn by solenoids according to embodiments of the disclosed subject matter.

FIGS. 6A and 6B are circuit diagrams for measuring response times of microvalves 118*a* and power drawn by solenoids 112, respectively.

For initial testing of a solenoid actuation system according to embodiments of the disclosed subject matter, an NI USB-6009 DAQ card (National Instruments Inc) can be used. This DAQ card can provide a 5 V supply; 8 analog inputs (14-bit, 48 kS/s); 2 analog outputs (12-bit, 150 S/s); 12 digital I/O; and a 32-bit counter. The card may be compatible with LabVIEW and MATLAB through the NI-DAQmx driver software. Since the solenoids 112 represent inductive loads, protective diodes may be provided to prevent any back EMF generated—in the event that the solenoid 112 is suddenly turned off—from damaging the integrated circuits. The power rating for the solenoids may be 1.15 W (100% continuous duty cycle, 6V supply)—2.3 W (50% duty cycle 9V supply) equivalent to currents of 190 mA-285 mA respectively. Switching transistors rated up to 3 A may be used for switching the solenoids 112 on and off. Opto-isolators may be used to separate the PC control section from the solenoid section FIG. 6A shows connection of a NI USB-6009 DAQ card (National Instruments Inc), for example, which, as indicated above, can provide a 5 V supply; 8 analog inputs (14-bit, 48 kS/s); 2 analog outputs (12-bit, 150 S/s); 12 digital I/O; and a 32-bit counter. Switching transistors rated up to 3A may be used for switching the solenoids 112 on and off. Opto-isolators also may be used to separate the PC from the solenoid section. The PC also may control an imaging camera.

With this setup it is possible to obtain timing information for control signals sent to the solenoid 112 as well as that for the video frames captured, as all timing sources can be synchronized to a system clock. The camera may be configured such that the frame capture rate is 57 frames/second (~17 ms per frame). Mean pixel intensities can be measured using image processing software across a rectangular region of interest occupying a center third of the valve area (FIG. S4). Two sets of system time information were compared to determine the response of the valve after the control signal had been sent from the DAQ card.

FIG. 6B shows that a separate regulated DC power supply (MASTECH HY3005D) with a current meter may be provided and connected to the circuit such that it provides power only to the solenoid part of the circuit. The solenoid 112 can be switched on and off thirty-three times, for example, using the aforementioned NI-DAQ card and the current measured by the power supply can be recorded, for example, on a computer readable medium.

Different types of microvalves can have different response times. For instance, hydrogel-based microvalves can respond in seconds to minutes and may be well-suited for drug delivery and other applications where slow delivery and control of fluid flow may be required. By contrast, relatively faster response times (on the order of seconds or less) may be needed for analytical systems where sorting, splitting, and merging of fluid are prevalent.

A response time of the valve can be measured by measuring the difference in time for when the control signals are sent to the valve and when a change in the valve opening state is observed. For water-filled control channels, a response time of 53±5 ms may be observed. The response time of the microvalves was also measured with control channels filled with ionic liquid. A response time for microvalves with control channels filled with ionic liquid can be 128±14 ms.

FIGS. 7A-7H show various representations regarding valve 118a operation.

Figure 7C:
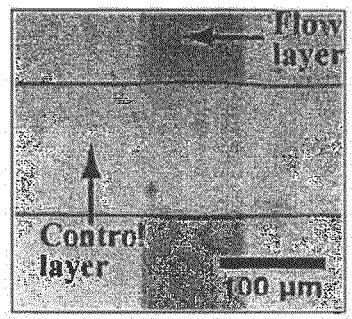
FIG. 7C is a timing diagram showing time versus valve opening percentage according to embodiments of the disclosed subject matter.
Figure 7C:
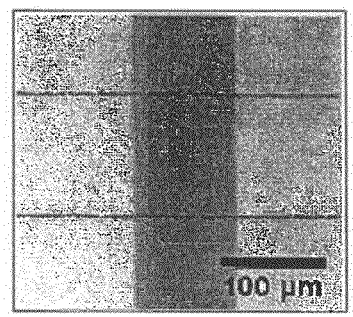
Figure 7C:
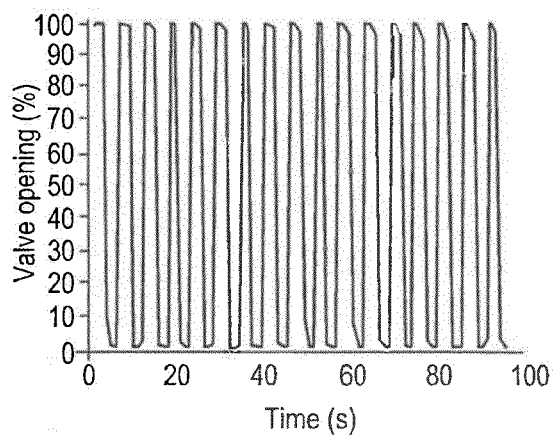
Figure 7D:
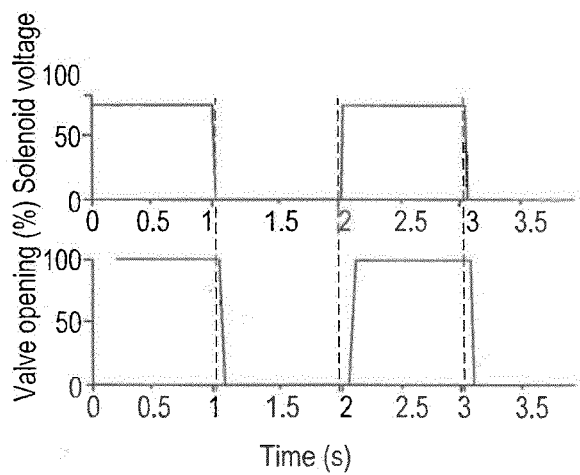
FIG. 7D shows two corresponding timing diagrams, with the top diagram showing time versus solenoid voltage and the bottom diagram showing time versus valve opening percentage corresponding to the top diagram.
Figure 7E:
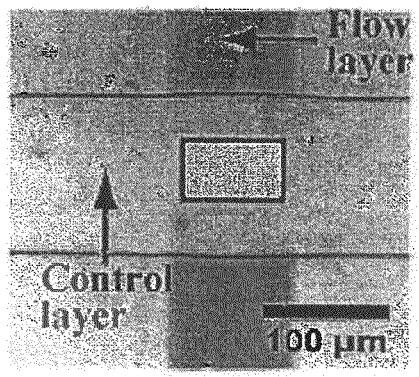
FIG. 7E-7H are various representations regarding valve operation according to embodiments of the disclosed subject matter.
Figure 7F:
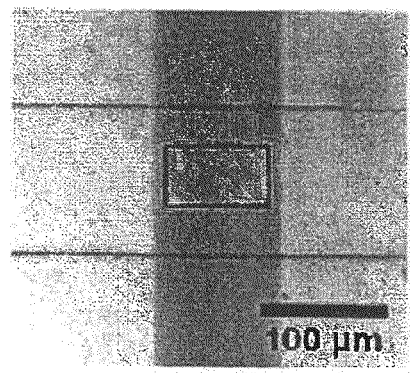
Figure 7G:
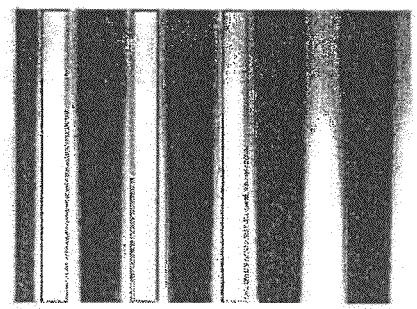
Figure 7H:
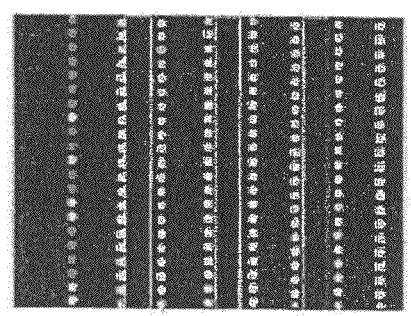

Regarding demonstration of operation of the valve, a colored dye can be flowed through the microfluidic channel using, for example, a Kent Scientific pump operating at 1 µL/min, opening and closing the valve 118a at various times. FIGS. 7A and 7B are Bright Field images of the valve 118a closed at 90 seconds and open at 5 seconds, respectively. FIGS. 7C and 7D are graphs respectively showing opening and closing of the valve recorded over 100 secs (16 cycles) and time response of valves 100 µm×100 µm×12 µm and ~86 mm long filled with water as the hydraulic fluid, in various embodiments, the average time for the valve to close for devices filled with water was 53.4 MS. As can be seen, fluid flow can be observed in the open state, and no flow can be observed in the closed state. The degree of "valve opening" can be estimated by expressing the mean pixel intensity value of the dye region as a percentage between the maximum (255 for 8-bit grayscale values) and minimum (0) pixel intensities. As shown, the valve can be opened and closed consistently over at least 16 cycles.

Figure 8:
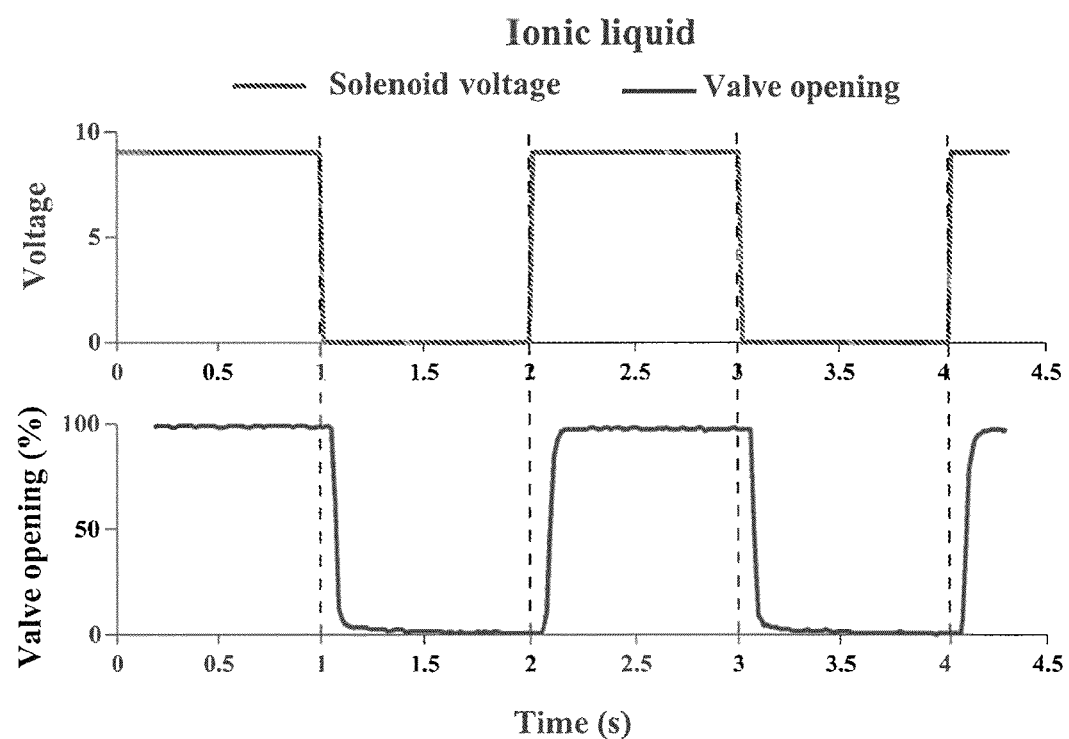
FIG. 8 shows a time response graph for valves filled with ionic liquid as the hydraulic fluid according to embodiments of the disclosed subject matter.

FIG. 8 shows a time response graph for valves 100 µm×100 µm×12 µm and ~8.6 mm long filled with ionic liquid as the hydraulic fluid. The average time for the valve to close for devices filled with ionic liquid according to embodiments of the disclosed subject matter is 127.5 ms.

Figure 9A:
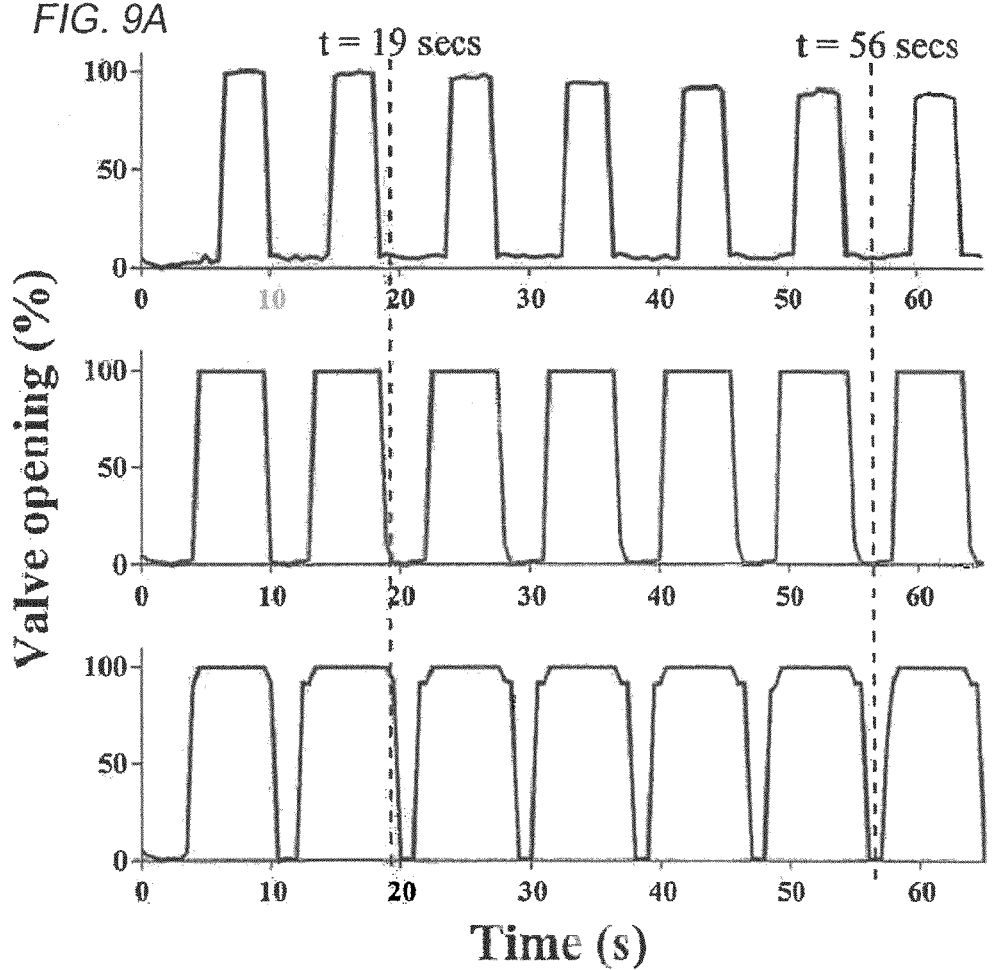
Figure 9A:
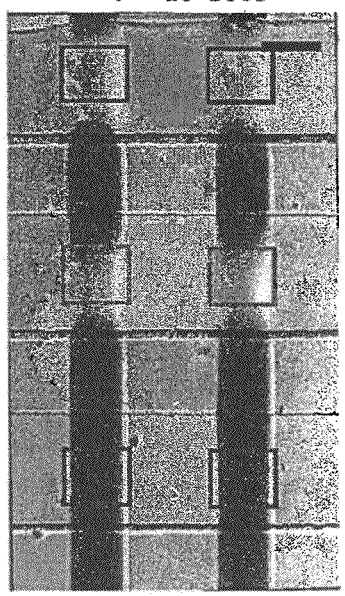
Figure 9A:
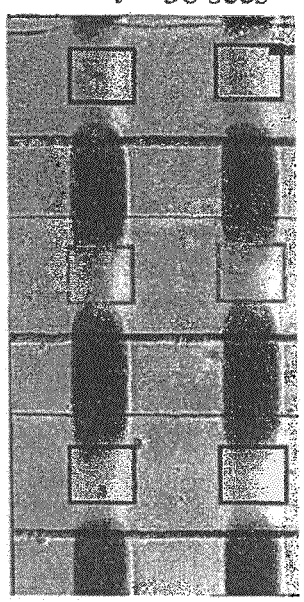

FIGS. 9A and 9B Show parallel operation of multiple valve locations. The ability to coordinate the operation of multiple microvalves can tested via solenoid-driven control.

For example, the ability of three solenoids to control six microvalves (e.g., each solenoid can control two valves). A data acquisition module may be used in order to accurately monitor the response times of the valves. Color dye was flowed through two parallel microchannels in the fluid layer; three microvalves regulated flow at different sections of a single microchannel. A micropump, such as a Kent Scientific syringe pump may be operated as a vacuum pump with a 30 ml BD syringe. The fluid flow rate may be approximately 4 µL/min, from the bottom of the image to the top. Images represent bright field images taken with a QImaging Retiga 2000R 16 bit monochrome camera. FIG. 9A is a plot showing valve opening and closing versus time at three highlighted locations according to FIG. 9B (i.e., an upper, middle, and bottom) which represents snapshots of the fluid and control channels at 19 and 56 seconds. With the three valves designated as upper, middle, and bottom, the valves can be operated in the following arbitrary sequence: open upper (t=3 sec), open middle (t=4 sec), open bottom (t=5 sec), hold all three valves open (t=5 to 9 sec), close bottom (t=9 sec), close middle (t=10 sec), close upper (t=11 sec), hold all three valves closed (t=11 to 13 sec), and repeat the cycle. (In this sequence, the upper valve area remained opened for the longest period, whereas the bottom valve area the shortest.)

FIGS. 10A-D represent information regarding detection of horse radish peroxidase in systems and devices according to embodiments of the disclosed subject matter.

Figures 10A, 10B:
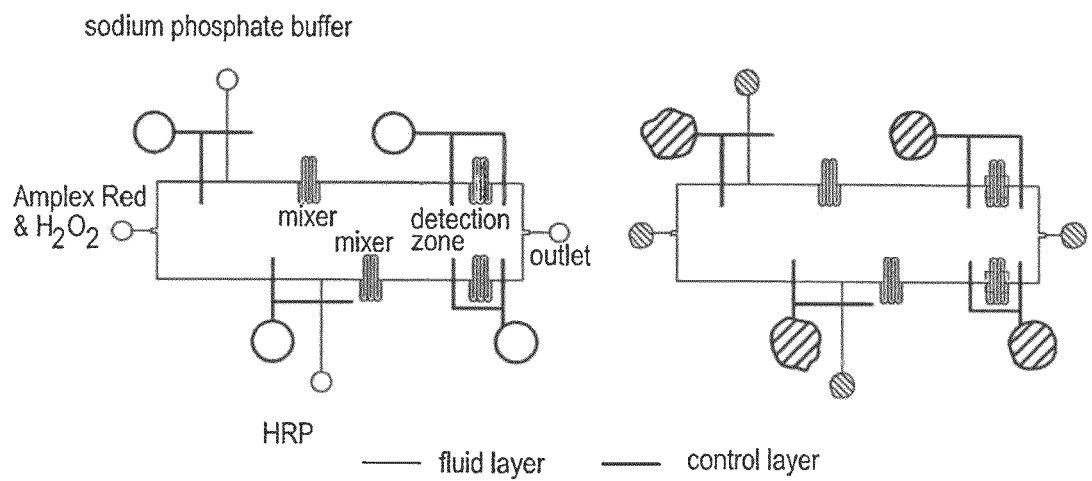
FIGS. 10A-10D represent information regarding detection of horse radish peroxidase in systems and devices according to embodiments of the disclosed subject matter.
Figure 10C:
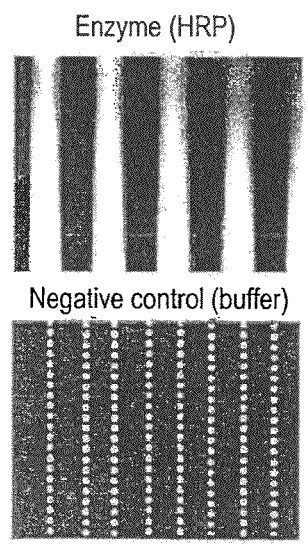
Figure 10D:
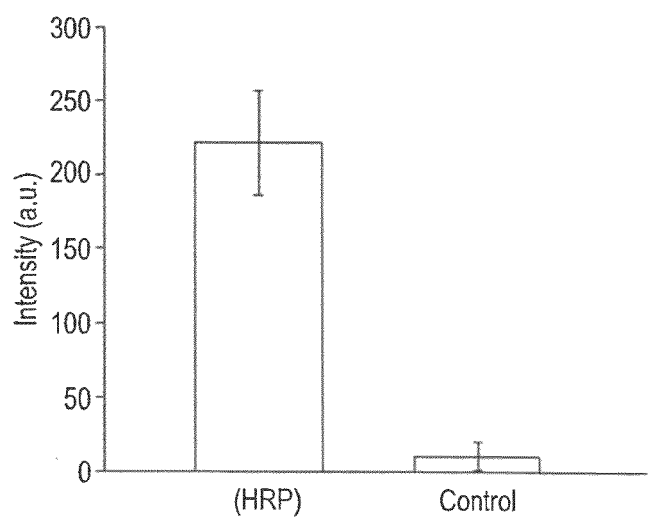

FIGS. 10A and 10B are outlines of a microfluidic network according to embodiments of the disclosed subject matter showing the fluid and control layers, inlets and outlets (i) and image of microfluidic chip filled with the fluid and control channels filled with food coloring. The region within the detection zones that are imaged and analyzed are shown in FIG. 10C (i.e., Image of detection zone showing epifluorescence produced from mixing 100 µM Amplex Red reagent, 2 mM $H_2O_2$ and 20 mU of HRP in 50 mM and sodium phosphate buffer pH 7.4 (i) and from mixing 100 µM Amplex Red reagent, 2 mM hydrogen peroxide and 50 mM sodium phosphate buffer pH 7.4 which is used as a control). Dashed lines represent the channel outlines. The mixtures can be incubated for thirty minutes confined within the respective detection zones and a plot of the relative intensity ($a_i$=585 nm) of the fluorescence produced by the reaction of Amplex red, hydrogen peroxide and HRP and for a no-HRP (sodium phosphate buffer) control reaction. Background fluorescence, determined for the no-HRP control region was subtracted from the HRP values can be made.

To demonstrate the fluid handling capability of the microcontroller based electronic control system, an assay can be run to detect horse radish peroxidase (as a mock sample) using Amplex Red. The Amplex Red reagent can be prepared in 1× reaction buffer to a final concentration of 100 µM, and mixed with 2 mM $H_2O_2$. 200 µL of the resulting solution was drawn into 5 cm-long Tygon tubing (0.050"×0.090"0D), and connected it to the input port of the microfluidic network shown in FIG. 10A. Similarly, tubings 100 µL of sodium phosphate buffer (pH–7.4) and horse radish peroxidase in 1× reaction buffer can be connected to two other inlet ports. A small battery-powered micropump can be connected to the outlet and used to draw the fluids through the microfluidic network. After mixing, the valves can be closed to confine the mixed reagents within the detection zones. Fluorescence can be measured by analyzing mean intensities of light emanating from three rectangular regions within the detection zone. The background may be subtracted from the signal region to obtain corrected values of fluorescence.

The use of this compact setup can be tested to operate the valves in the microfluidic chip. The MCU or microprocessor can be programmed to turn on the solenoids in the following sequence (referring to FIG. 10A): turning on the micropump (t=0 sec), open valves 1, 2, 3 and 4 (t=5 sec) and keeping them open (t=5 to 25 sec) to allow mixing of the fluorescent dye with a negative control (i.e. sodium phosphate buffer), close valves 1, 2, 3, and 4 (t=25 sec) to confine the mixed solution to the detection zone. This sequence can be repeated with valves 5, 6, 7 and 8 to mix the fluorescent dye with the sample (horseradish peroxidase), and confine the mixed sample to the detection zone. Finally the MCU or microprocessor can turn off the micropump one second later, and the valves can be closed off during a thirty-minute incubation period.

A solenoid-control system may be used to conduct a biological assay. A microcontroller can be pre-programmed with a solenoid-actuation sequence. This sequence of valve operation can be tested, as discussed above, by using water and colored dyes as substitutes for the actual reagents, and thereby observe the expected fluid movement. For the biological assay, a buffer may be used as negative control and horseradish peroxidase as sample, and measurement of the fluorescence intensity in the two detection regions. The assay may produce a fluorescent signal for the case with enzyme and a background signal for the case of the negative control, with significant differences in the fluorescence intensities, as expected.

In the present embodiments, the solenoids can close the microvalves without a continuous supply of power. Many biological assays feature incubation times where valves would need to stay closed to confine samples or reagents. Current drawn by a single solenoid (using a circuit described above) for thirty-three consecutive on-off cycles to can have an average of 233 mA per cycle. Using estimates of power consumption from the manufacturers' data sheets for other components, the estimated energy consumption for a twenty-minute biological assay is 35 mA hour (see Table 1 below). Assuming 80% of capacity of a 9V dry-cell battery rated for –625 mA hour, the handheld instrument for controlling the pneumatic microvalves according to various embodiments of the disclosed subject matter can operate for approximately thirty-six assays using a single battery.

The solenoids used to drive the hydraulics are rated to operate from 6V to 12V with a power rating of 2.3 W below a 50% duty cycle (maximum on time of 100 seconds at 8.5V). From calculations based on data sheets provided by manufacturer, the current drawn by each solenoid is about 250 mA. For a typical assay, it is assumed that the valves are open for 10% of the time for an assay that runs for 20 minutes.

TABLE 1

| Component | Voltage (V) | Current (mA) | Quantity | Power (W) | Avg % On time per run | Usage (W) | Usage (mAH) |
|---|---|---|---|---|---|---|---|
| Microcontroller | 5.0 | 12 | 1 | 0.06 | 100 | 0.06 | 4.0 |
| Solenoid | 9.0 | 233* | 4 | 8.40 | 10 | 0.83 | 31.1 |
| 4N35 Optoisolator | 1.2 | 10 | 4 | 0.05 | 10 | 0.01 | 0.3 |
| TIP 31 SwitchingTransistor | 9.0 | | 4 | | 10 | | |
| 2N3902 Switching Transistor | 5.0 | | 4 | | 10 | | |
| Totals | | 255 | | 8.51 | | 0.90 | 35.4 |

Figure 11:
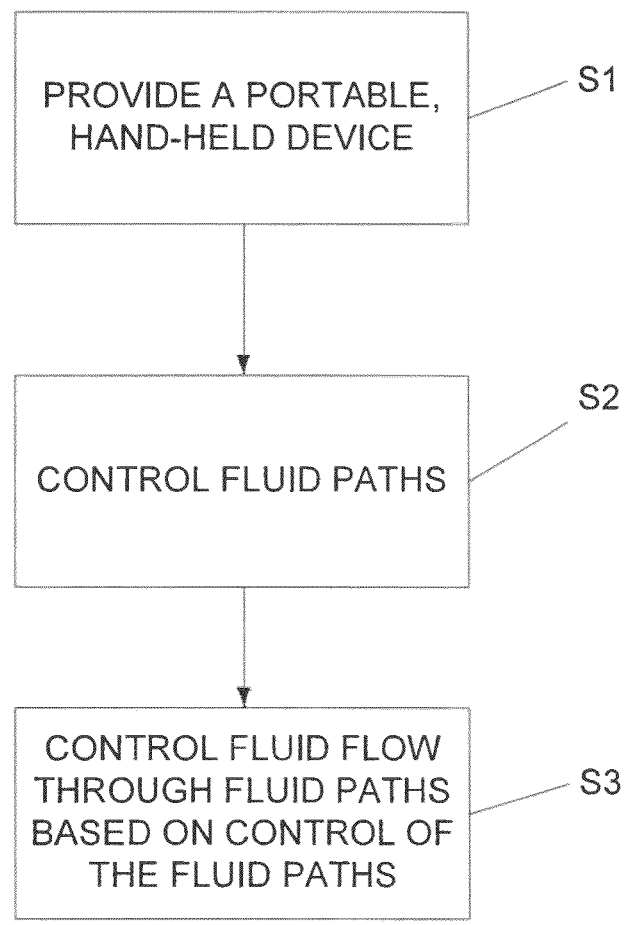
FIG. 11 is a diagram illustrating a method according to embodiments of the disclosed subject matter.

*Measured value. All other current values are estimates from manufacturer's data sheets FIG. 11 is a diagram illustrating a method according to embodiments of the disclosed subject matter.

At S1 a portable, hand-held apparatus or device, such as described herein can be provided. At S2, fluid paths in the device can be control. For example, a control channel may be controlled by a solenoid actuator to modify a pressure of a fluid encapsulated within the control channel. By controlling the fluid of the control channel, the fluid of the control channel can react, for example against a flexible valve, such as a membrane, thereby causing the flexible valve to move. Movement of the flexible valve can restrict or completely block fluid flow of an associated flow channel, thereby opening and closing the flow channel S3.

Having now described embodiments of the disclosed subject matter, it should be apparent to those skilled in the art that the foregoing is merely illustrative and not limiting, having been presented by way of example only. Numerous modifications and other embodiments (e.g., combinations, rearrangements, etc.) are within the scope of one of ordinary skill in the art and are contemplated as falling within the scope of the disclosed subject matter and any equivalents thereto. It can be appreciated that variations to the e disclosed subject matter would be readily apparent to those skilled in the art, and the disclosed subject matter is intended to include those alternatives. Further, since numerous modifications will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

What is claimed is:

1. A portable micro flow device, comprising:
one or more solenoid actuators, each having a cylindrical plunger with a diameter of less than 5 mm and providing a force of less than 5 N;
each of the one or more solenoid actuators having a return spring attached thereto, the return spring being configured to apply a restoring force to move the cylindrical plunger to a home position from an activated position;
each of the one or more solenoid actuators being connected to a respective control microfluidic channel to drive a fixed volume of hydraulic fluid sealed within the respective control microfluidic channel;
a microcontroller with a programmable component and a drive component connected to the one or more solenoid actuators and configured to operate the one or more solenoid actuators to press on the respective control microfluidic channel to generate a selected pressure in the fixed volume of the hydraulic fluid sealed in the respective control microfluidic channel;
the each control microfluidic channel being separated from a respective regulated microfluidic channel by a flexible barrier forming a valve configured to regulate flow in the respective regulated microfluidic channel and such that the valve is opened and closed in response to the one or more solenoid actuators being driven between its home and activated positions, the one or more solenoid actuators drawing a minimum electrical current in the home position, the home position corresponding to a predefined one of the opened and closed positions;

the programmable component being configured to operate the valve to perform a microfluidic process control sequence in which the longest cycles coincide with the minimum electrical current, whereby the energy required for operation is minimized; and a movable bracket supporting the one or more solenoid actuators, the bracket being movable with respect to at least the control microfluidic channels such that the one or more solenoid actuators can be positioned with respect to their respective control microfluidic channels and such that the one or more solenoid actuators can be moved away from their respective control microfluidic channels to allow for replacement of the control microfluidic channels.

2. The device according to claim 1, wherein the hydraulic fluid is aqueous.

3. The device according to claim 1, wherein the hydraulic fluid is water.

4. The device according to claim 1, further comprising a battery power source configured to provide the sole means for powering the one or more solenoid actuators and the microcontroller.

5. The device according claim 4, wherein the battery power source is a 9 volt battery.

6. The device according to claim 1, wherein the respective control microfluidic channel is sealed with the hydraulic fluid therein such that actuation of the corresponding valve between the open and closed positions does not result in any loss of hydraulic fluid from the fixed volume.

7. The device according to claim 1, wherein each control microfluidic channel is sealed such that repeated actuation of the corresponding valve does not change an amount of the hydraulic fluid therein.

8. The device according claim 1, wherein the microfluidic process control sequence performs an assay.

9. The device according to claim 1, wherein the control microfluidic channels and the regulated microfluidic channels are formed in layers, the regulated microfluidic channels being formed in a separate layer from the control microfluidic channels.

10. The device according to claim 9, wherein the layer with the control microfluidic channels is separated from the layer with the regulated microfluidic channels by a membrane having a thickness of between 50 and 1000 μm.

11. The device of claim 1, wherein each cylindrical plunger is configured to press on the respective sealed control microfluidic channel to pressurize the fixed volume of the hydraulic fluid therein, the pressurized hydraulic fluid causing the respective valve to move to the closed position in the respective regulated microfluidic channel.

12. The device of claim 1, wherein each control microfluidic channel is sealed such that a same mass of the hydraulic fluid is used for repeated actuations of the respective valve.

13. A method comprising:
providing a portable, hand-held device having a microvalve element and a battery;
the microvalve element having a plurality of solenoid actuators each having a cylindrical plunger and a return spring attached thereto to apply a restoring force to move the cylindrical plunger between a home position and an activated position;
the microvalve element further having a multi-layered substrate having a flow layer comprised of a plurality of flow channels and a control layer comprised of a plurality of control channels; each control channel having a flexible barrier forming a valve that regulates flow in the corresponding flow channel and being sealed with a fixed volume of hydraulic fluid therein, wherein each valve is configured to be opened and closed in response to pressure applied to the fixed volume of the hydraulic fluid in the sealed control channel by the corresponding solenoid actuator pressing the sealed control channel,
automatically controlling the pressure of the hydraulic fluid sealed within the control channels using the solenoid actuators, the solenoid actuators being automatically controlled by a microprocessor programmed with a predetermined sequence of control for actuating the solenoid actuators between the home and activated positions; and
automatically controlling flow of fluid through the flow channels based on said automatically controlling,
wherein the battery is the sole energy source for powering the solenoid actuators,
wherein the solenoid actuators are supported on a movable bracket and further comprising:
prior to the automatically controlling the pressure of the hydraulic fluid, moving the bracket to position the cylindrical plunger of each solenoid actuator with respect to the corresponding control channel.

14. The method of claim 13, wherein each said solenoid actuator has a cylindrical plunger with a diameter of less than 5 mm and providing a force of less than 5 N.

15. The method of claim 13, wherein the microprocessor is configured to operate the valves to perform a process control sequence in which a longest cycle coincides with a minimum electrical current.

16. The method of claim 13, wherein the portable, hand-held device has a footprint not greater than 13 cm, in any dimension.

17. The method of claim 13, wherein the portable, hand-held device has a footprint not greater than 13 cm×7.6 cm×5.8 cm.

18. The method of claim 13, wherein, to close one of the valves, one of the cylindrical plungers presses on a respective sealed control channel to pressurize the fixed volume of hydraulic fluid therein, the pressurized fluid thereby causing said one of the valves to move to the closed position in the corresponding flow channel.

19. The method of claim 13, wherein the automatically controlling the pressure of the hydraulic fluid is repeatedly performed without addition of hydraulic fluid to and without any loss of hydraulic fluid from the control channels.

20. The method of claim 13, further comprising:
after the automatically controlling flow of fluid through the flow channels, moving the bracket such that the solenoid actuators are spaced from the control channels; and
removing the control and flow channels to allow installation of new control and flow channels.

21. A method of making a hand-held device having an overall footprint, comprising:
providing a microcontroller, an energy storage device, linear actuators, and a microvalve element;
connecting the linear actuators, the energy storage device, and the microcontroller for control of the microvalve element;
forming a first stack of elements including the microcontroller and the energy storage device;
forming a second stack of elements including the linear actuators and the microvalve element;
the microvalve element having a generally planar structure with actuating surfaces arrayed over a surface of the generally planar structure;
arranging the first stack adjacent the second stack and attaching them to a chassis; and providing a movable bracket to support the linear actuators, to permit adjustment of the spacing of the linear actuators with respect to the microvalve element, and to permit replacement of the microvalve element.

22. The method of claim 21, wherein the microvalve element has a control layer arranged at ends of the linear actuators.

23. The method of claim 22, wherein the microvalve element has a plurality of channels filled with a fluid, the channels connecting elements of the control layer with valve elements.

24. The method of claim 21, further comprising forming the microvalve element by laminating rigid and flexible layers to form a flow layer with valve cells overlying a control layer with control cells that are arranged to be pressed by the linear actuators.

25. The method of claim 24, wherein each said control channel has at least one flexible barrier forming a valve cell that regulates flow in a corresponding flow channel, each valve cell being configured to be opened and closed, respectively, in response to the corresponding solenoid actuator being driven between home and activated positions.

26. The method of claim 24, wherein a flexible layer overlying control cells is a thicker material than the flexible layer overlying valve cells.

27. The method of claim 21, wherein each said solenoid actuator has a cylindrical plunger with a diameter of less than 5 mm and configured to provide a force of less than 5 N.

28. The method of claim 21, wherein the energy storage device includes a battery.

29. A method comprising:
providing a first layer having a flow channel therein;
providing a second layer over the first layer, the second layer having a control channel therein, the control channel being separated from the flow channel by a membrane that forms a valve within the flow channel;
sealing a fluid mass within the control channel;
after the sealing, disposing a solenoid actuator with respect to an actuation portion of the control channel; and
at least one of:
actuating the valve from an open position to a closed position by moving a plunger of the solenoid actuator to press on the actuation portion of the control channel, thereby increasing a pressure of the fluid mass to move the valve to the closed position; and
actuating the valve from the closed position to the open position by moving the plunger of the solenoid actuator away from the actuation portion of the control channel, thereby decreasing the pressure of the fluid mass to move the valve to the open position;
wherein:
the solenoid actuator is mounted on a bracket movable with respect to the first and second layers,
the disposing the solenoid actuator includes:
installing a stack of the first and second layers; and
moving the bracket to position the solenoid actuator with respect to the actuation portion of the control channel; and
further comprising, after the disposing and either actuating:
moving the bracket such that the solenoid actuator is spaced from the first layer; and
uninstalling the stack of the first and second layers.

30. The method of claim 29, wherein one of the moving the plunger to press on the actuation portion and the moving the plunger away from the actuation portion is performed by a spring biasing the plunger, and the other of the moving the plunger to press on the actuation portion and the moving the plunger away from the actuation portion is performed by actuating the solenoid actuator.

* * * * *